(12) United States Patent
Kerai

(10) Patent No.: US 10,462,759 B2
(45) Date of Patent: Oct. 29, 2019

(54) SYSTEM AND METHOD FOR CLOCK SYNCHRONIZATION ON A WIRELESS NETWORK

(71) Applicant: Dialog Semiconductor B.V., 's-Hertogenbosch (NL)

(72) Inventor: Kanji Kerai, London (GB)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 0 days.

(21) Appl. No.: 15/420,201

(22) Filed: Jan. 31, 2017

(65) Prior Publication Data

US 2018/0220384 A1  Aug. 2, 2018

(51) Int. Cl.

| | |
|---|---|
| *H04W 56/00* | (2009.01) |
| *H04W 4/80* | (2018.01) |
| *H04J 3/06* | (2006.01) |
| *H04B 17/318* | (2015.01) |
| *H04L 12/24* | (2006.01) |
| *H04L 12/721* | (2013.01) |
| *H04W 40/24* | (2009.01) |

(52) U.S. Cl.
CPC ......... *H04W 56/001* (2013.01); *H04J 3/0664* (2013.01); *H04W 4/80* (2018.02); *H04B 17/318* (2015.01); *H04L 41/0645* (2013.01); *H04L 41/12* (2013.01); *H04L 45/127* (2013.01); *H04W 40/248* (2013.01); *H04W 56/0005* (2013.01); *H04W 56/0055* (2013.01)

(58) Field of Classification Search
CPC ..... H04W 56/001; H04W 4/80; H04W 4/008; H04W 56/0055; H04W 56/0005; H04L 7/0008

See application file for complete search history.

(56) References Cited

U.S. PATENT DOCUMENTS

| | | | | |
|---|---|---|---|---|
| 8,848,571 | B2 * | 9/2014 | Picard | G01D 4/004 370/252 |
| 9,699,593 | B2 * | 7/2017 | Viswanadham | H04W 4/80 |
| 9,848,069 | B2 * | 12/2017 | Geboff | H04L 69/329 |
| 9,986,507 | B2 * | 5/2018 | Viswanadham | H04L 12/1886 |
| 10,057,133 | B2 * | 8/2018 | Skaaksrud | H04W 4/80 |

(Continued)

OTHER PUBLICATIONS

Specification of the Bluetooth System: Core System Package [Host volume], vol. 3, Part H, Security Manager Specification, pp. 586-688, Dec. 2, 2014, Specification vol. 0 Table of Contents, 3 pgs, Specification vol. 3 Core System Package, 3 pgs.

(Continued)

*Primary Examiner* — Brian T O Connor
(74) *Attorney, Agent, or Firm* — Saile Ackerman LLC; Stephen B. Ackerman

(57) ABSTRACT

A method of synchronizing the clocks of a master device and at least a first slave device which are connected on a wireless network. The method includes sending a scan command from the master device to at least the first slave device, setting the master device to a broadcast mode and broadcasting data, the broadcast data comprising a first time stamp; scanning the broadcasting data at at least the first slave device and resetting the clock of the first slave device using the first time stamp. In particular, but not exclusively, the present disclosure relates to synchronizing the clocks of two devices which are connected on a Bluetooth Low Energy (BLE) wireless network.

14 Claims, 5 Drawing Sheets

(56) References Cited

U.S. PATENT DOCUMENTS

| | | | |
|---|---|---|---|
| 10,111,172 B2* | 10/2018 | Wang | H04W 52/0229 |
| 2013/0165044 A1* | 6/2013 | Xie | H04W 52/0229 |
| | | | 455/41.2 |
| 2015/0092642 A1* | 4/2015 | Geboff | H04L 69/329 |
| | | | 370/311 |
| 2016/0100276 A1* | 4/2016 | Viswanadham | H04W 4/80 |
| | | | 455/41.2 |
| 2016/0250517 A1* | 9/2016 | Tilvis | H04Q 9/00 |
| | | | 700/91 |
| 2017/0311361 A1* | 10/2017 | Granbery | H04W 76/021 |
| 2018/0007647 A1* | 1/2018 | Bilstad | H04W 56/0015 |
| 2018/0081390 A1* | 3/2018 | Dominguez | G06F 1/12 |
| 2018/0124731 A1* | 5/2018 | Klotchkov | H04W 56/0015 |
| 2018/0160334 A1* | 6/2018 | Deshpande | H04W 28/08 |

OTHER PUBLICATIONS

Specification of the Bluetooth System: Core System Package [Low Energy Controller volume], vol. 6, Part E, Low Energy Link Layer Security, pp. 165-192, Dec. 2, 2014, Specification vol. 0 Table of Contents, 3 pgs, Revision History, 3 pgs.

"Synchronization in wireless biomedical-sensor networks with Bluetooth Low Energy," by Andre Bideaux et al., De Gruyter, Current Directions in Biomedical Engineering 2015; 1:73-76, Sep. 12, 2015.

* cited by examiner

SYSTEM AND METHOD FOR CLOCK SYNCHRONIZATION ON A WIRELESS NETWORK

TECHNICAL FIELD

The present disclosure relates to synchronising the timing of two devices which are connected on a wireless network. In particular, but not exclusively, the present disclosure relates to synchronising the clocks of two devices which are connected on a Bluetooth Low Energy (BLE) wireless network.

BACKGROUND

One popular protocol for wireless connectivity is Bluetooth. A recent version of this is the Bluetooth Low Energy (BLE) standard, also referred to as Bluetooth Smart.

Every Bluetooth device has an internal clock comprising a crystal oscillator which oscillates with a range of frequencies, typically 2 MHz, 1 MHz and 32 KHz. Many Low Power Bluetooth components depend on this clock, such as for the radio frequency "hops" that can happen with the lowest time as 200 μs. In a network of Bluetooth devices (termed a piconet), all devices must hop channels in the same manner to be able to communicate, and so all the devices' clocks must be synchronized.

However, Bluetooth does not provide time synchronisation as a service to applications. There is limited access to the internal Bluetooth clock and this access is via a slow serial connection between the main processor and the Host Controller Interface (HCI). Therefore, other methods of synchronisation must be used.

The BLE specification defines a connection model with a minimum connection interval of 7.5 ms. Rather than being continuously connected, the devices only temporarily connect (termed a connection event) once during each connection interval. The purpose of this is to save power, which is a key objective of the BLE standard. The advantage of having a relatively long connection interval is that significant power is saved, since a device can sleep most of the time between connection events.

However, one disadvantage of the long connection interval is that, if one device has data that it needs to send to another device, it must wait until the next connection event. This introduces an element of randomness to the timing of data exchange. The data that is to be sent may have been generated at any time between the previous and the next connection event. Under the BLE standard, and using the minimum connection interval, two devices cannot connect and exchange data more frequently than every 7.5 ms. Therefore, there will be a delay of between zero and 7.5 ms between the generation of the data and its transmission and receipt by the other device. The actual value of this delay is random and non-deterministic.

On a wired network or even a wireless network of permanently connected devices, the clock synchronisation of connected devices is typically straightforward using a common clock or by exchanging time stamps. However, the distributed nodes on a BLE wireless network have no common clock and so the local time of each node can drift. Exchanging time stamps while connected is of limited accuracy due to the delay of up to 7.5 ms for data exchange.

Various synchronisation methods for wireless networks are known but all rely on deterministic times for exchanging data. Also, many of these methods have limited accuracy. In certain practical applications, having an accuracy below 1 ms is necessary. Just one example of this is a network of sensors measuring brain activity using EEG.

A BLE device may operate in one of four different modes. The main modes of operation are called the broadcasting mode, scanning mode, initiator mode, master device mode, and slave device mode. Prior to connecting, a BLE device can be in broadcasting mode or scanning mode. In broadcasting mode, the BLE device periodically broadcasts advertising information and may respond with more information upon request from other devices. A device in scanning mode 'listens' to advertising information and may request additional information if active scanning is enabled. To establish a connection between two devices, one device has to be in broadcasting mode and the other device in initiator mode. The initiator scans for a desirable advertising packet and consequently sends a connection request. Once a connection is established, the initiator assumes the role of master device and the advertiser becomes a slave device.

SUMMARY

A master device can have multiple simultaneous connections with different slave devices, whereas each slave device can only be connected to one master device. This arrangement has been used in many practical applications, such as wirelessly connecting a number of sensors (slave devices) to a master device. However, it is necessary to synchronise the clocks of each of the slave devices, as well as the slave devices to the master device.

Given the ubiquitous nature of Bluetooth connectivity, it is desirable to have an accurate method of clock synchronisation on a Bluetooth or BLE network.

According to a first aspect of the present disclosure there is provided a method of synchronising the clocks of a master device and at least a first slave device which are connected on a wireless network, the method comprising:

sending a scan command from the master device to at least the first slave device;

setting the master device to a broadcast mode and broadcasting data, the broadcast data comprising a first time stamp;

scanning the broadcasting data at at least the first slave device and resetting the clock of the first slave device using the first time stamp.

Optionally, the wireless network is a Bluetooth network. Optionally, the wireless network is a BLE network.

It will be appreciated that the principles of this disclosure are not limited to BLE but may also apply to other versions of Bluetooth including Bluetooth 5, and to other wireless protocols.

Optionally, the method comprises synchronising the clocks of a master device and a plurality of slave devices.

Optionally, the method includes sending a scan command to at least the first slave device to scan at least one advertising channel.

Optionally, the method includes broadcasting data from the master device on at least one advertising channel.

Optionally, the method includes configuring the master device to specify a first scanning period for at least the first slave device. Optionally, the method includes specifying a relatively long first scanning period, such as 1 s.

Optionally, the method includes configuring the master device to specify a first broadcasting period for the master device. Optionally, the method includes specifying a relatively long first broadcasting period, such as 1 s.

Optionally, the method includes configuring the master device to broadcast only one set of advertising packets.

Optionally, the method includes configuring the master device to broadcast data between two successive connection events.

Optionally, subsequent to reconnecting the master device and at least the first slave device, the method includes configuring the master device to specify a first connection interval for at least the first slave device.

Optionally, subsequent to reconnecting the master device and at least the first slave device, the method includes configuring at least the first slave device to send a second time stamp to the master device.

Optionally, the method includes configuring the master device to compare the received second time stamp with a time of receipt of the second time stamp.

According to a second aspect of the present disclosure there is provided a system comprising a master device connected to at least a first slave device on a wireless network,
  wherein the master device is configured to:
    send a scan command to at least the first slave device; and
    switch to a broadcast mode and broadcast data, the broadcast data comprising a first time stamp,
  and wherein at least the first slave device is configured to:
    scan the broadcasting data and reset the clock of the first slave device using the first time stamp.

Optionally, the master device is connected to at least the first slave device on a Bluetooth network. Optionally, the master device is connected to at least the first slave device on a BLE network.

Optionally, the master device is connected to a plurality of slave devices.

Optionally, the first slave device is configured to scan at least one advertising channel.

Optionally, the master device is configured to broadcast data on at least one advertising channel.

Optionally, the master device is configured to broadcast only one set of advertising packets.

Optionally, the master device is configured to broadcast data between two successive connection events.

Optionally, subsequent to reconnecting the master device and at least the first slave device, at least the first slave device is configured to send a second time stamp to the master device.

Optionally, the master device is configured to compare the received second time stamp with a time of receipt of the second time stamp.

BRIEF DESCRIPTION OF THE DRAWINGS

The disclosure will be described below, by way of example only, with reference to the accompanying drawings, in which.

DESCRIPTION

BLE is defined in various standards documents, including for example the "Specification of the Bluetooth System", Covered Core Package version 4.2, Volumes 1-7, which are hereby incorporated by reference.

Figure 1:
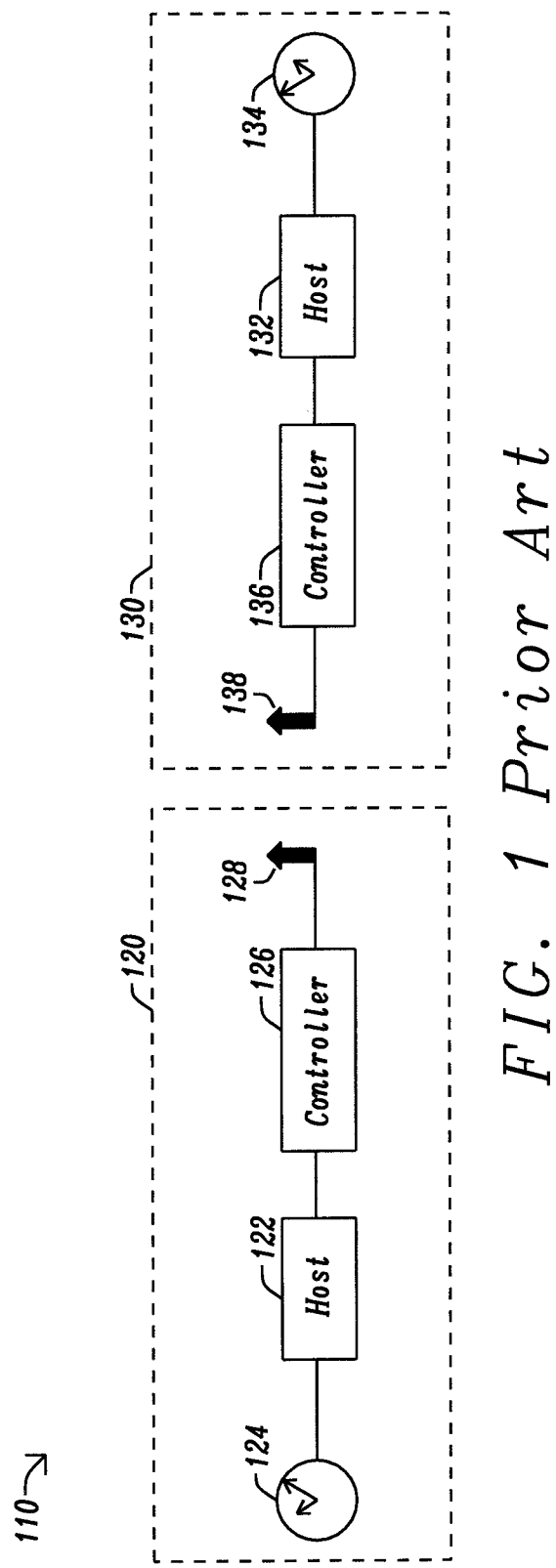
FIG. 1 is a schematic view of a system comprising two wirelessly connected devices in accordance with the prior art.

FIG. 1 shows a prior art system 110 comprising two devices which are wirelessly connected via a BLE network. Bluetooth enabled devices may act as either a master or a slave device. However, when a piconet is formed between two or more devices, one device takes the role of 'master', and all other devices assume a 'slave' role. In FIG. 1, a first device is acting as the master device 120 while a second device is acting as the slave device 130.

The master device 120 comprises a host device 122 which has an internal clock 124 and is connected to a network interface controller 126 which manages connection of the host device 122 to a wireless network via an RF transceiver 128. Similarly, the slave device 130 comprises a host device 132 which has an internal clock 134, a network interface controller 136 and an RF transceiver 138.

The master device 120 coordinates the medium access by using a Time Division Multiple Access (TDMA) scheme. The master device 120 also provides the slave device 130 with the information needed for frequency hopping when transmitting data and for the connection supervision. The parameters for the management of a connection, such as the value of the connection interval, are transmitted in the Connection Request message. The connection interval may be in the range of 7.5 ms to 4.0 s.

Figure 2:
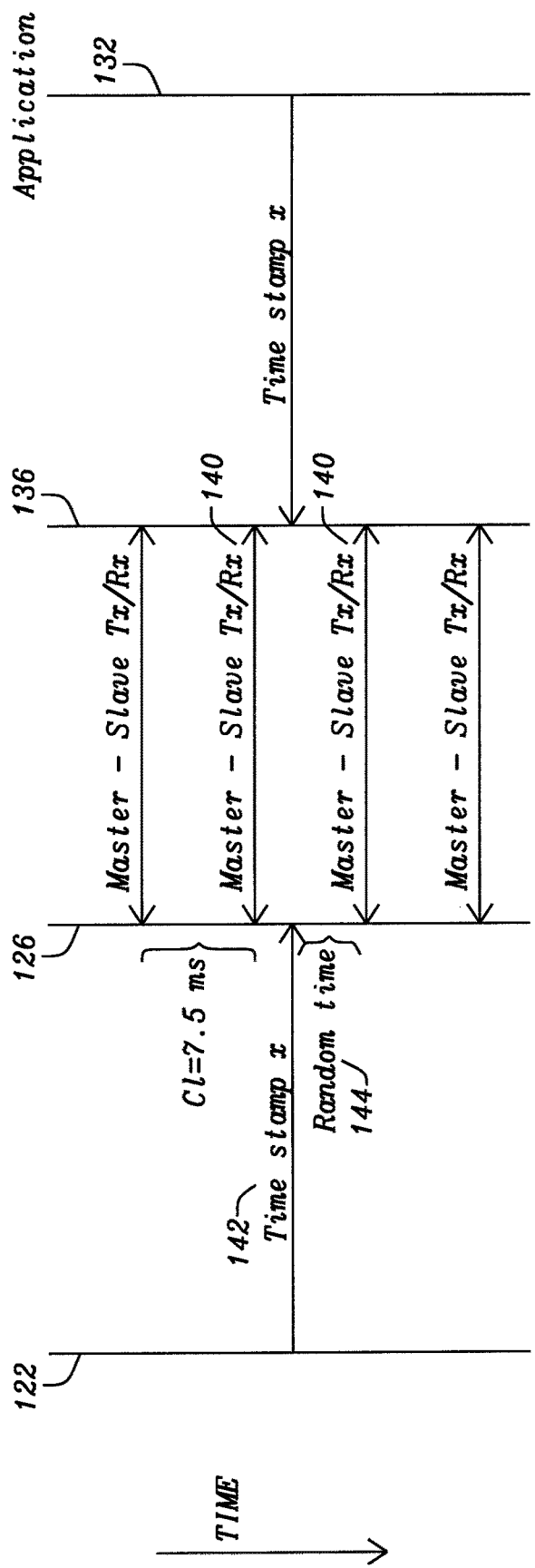
FIG. 2 is a timeline diagram showing the timing of connection events for the devices of FIG. 1.

FIG. 2 shows a timeline of data transmission between the master device 120 and slave device 130 shown in FIG. 1. In the embodiment of FIG. 2, the connection interval is the minimum possible connection interval of 7.5 ms.

When the master device 120 and the slave device 130 are connected, the physical channel is divided into non-overlapping time units called connection events 140. During a connection event 140, the master and slave devices alternate sending and receiving data packets. Only one connection event 140 occurs within each connection interval, therefore every 7.5 ms.

As part of a synchronisation procedure, the application on the host device 122 generates a first time stamp 142 which is sent to the controller 126 for transmitting to the slave device 130. However, the first time stamp 142 is not sent until the next connection event 140 and so there is a random delay 144 of between zero and 7.5 ms. Once transmitted, the first time stamp 142 is received by the controller 136 of the slave device 130 and passed to the host device 132. If the clock 134 of the slave device 130 is reset based upon the first time stamp 142, the master and slave devices will not be accurately synchronised due to the delay 144.

Figure 3:
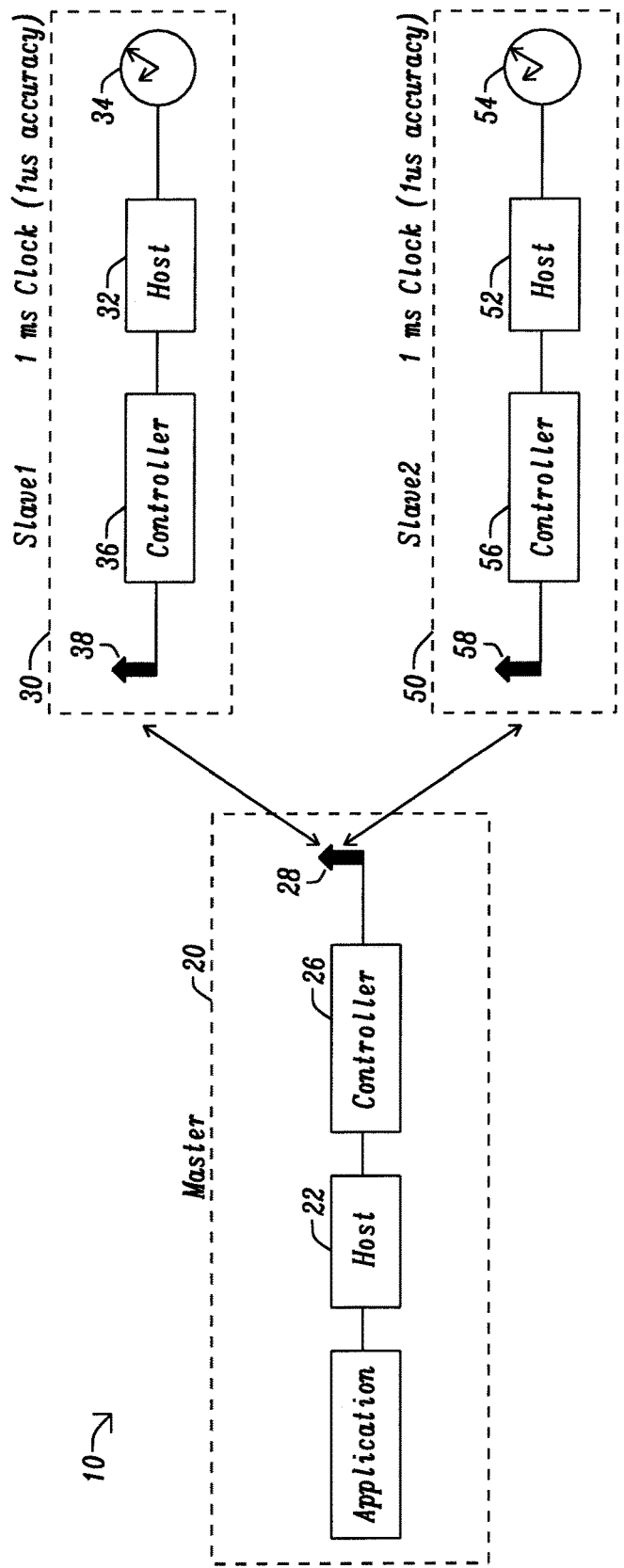
FIG. 3 is a schematic view of a system comprising three wirelessly connected devices in accordance with the disclosure.

FIG. 3 shows a system 10 according to the disclosure which in this illustrative example comprises three devices which are wirelessly connected via a BLE network. Like features are given like reference numerals.

As before, a master device 20 comprises a host device 22, an internal clock 24, a network interface controller 26 and an RF transceiver 28. Similarly, a first slave device 30 comprises a host device 32, an internal clock 34, a network interface controller 36 and an RF transceiver 38. Also, a second slave device 50 comprises a host device 52, an internal clock 54, a network interface controller 56 and an RF transceiver 58.

Figure 4:
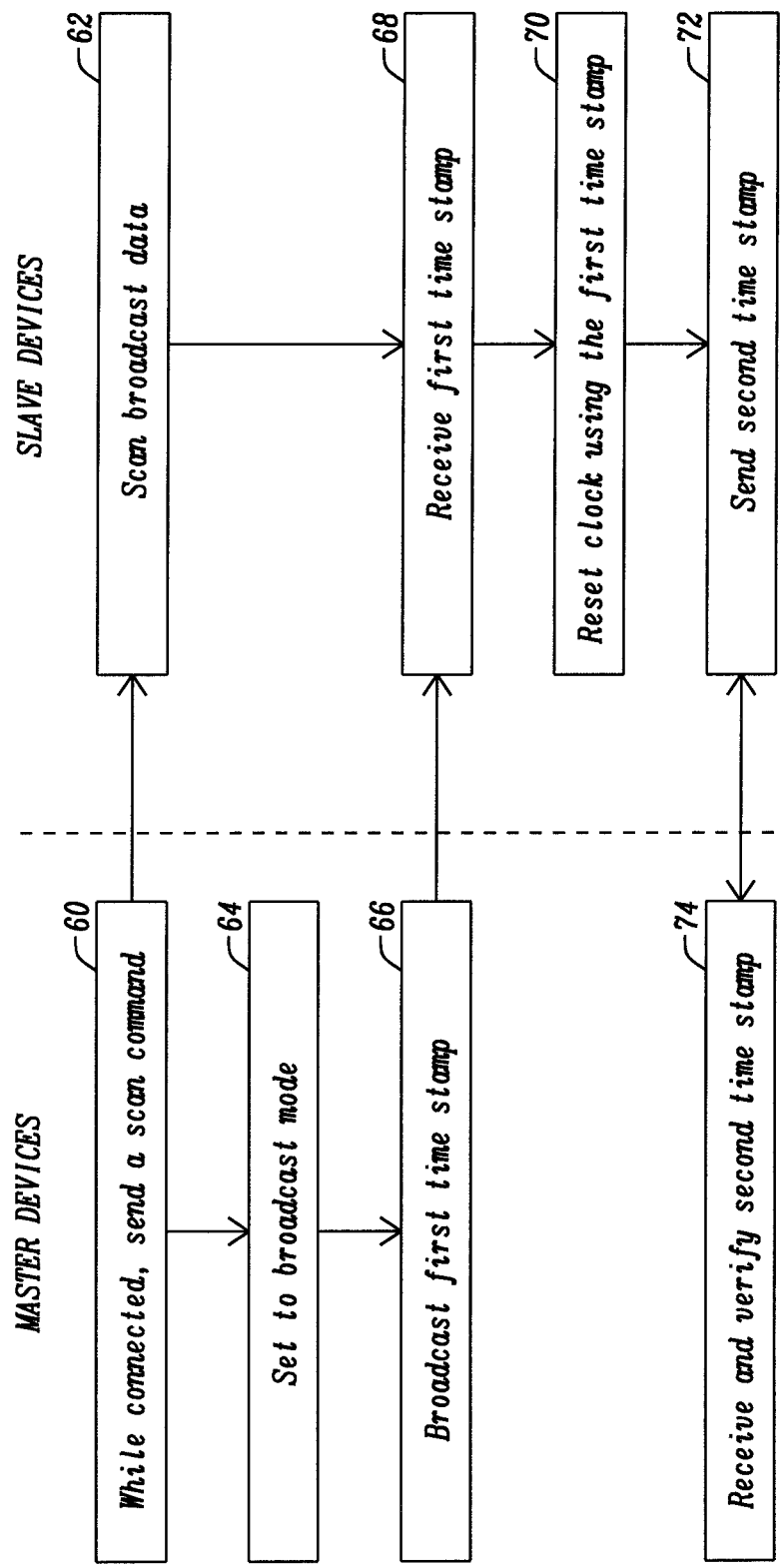
FIG. 4 is a flowchart showing the steps of a method in accordance with the disclosure.
Figure 5:
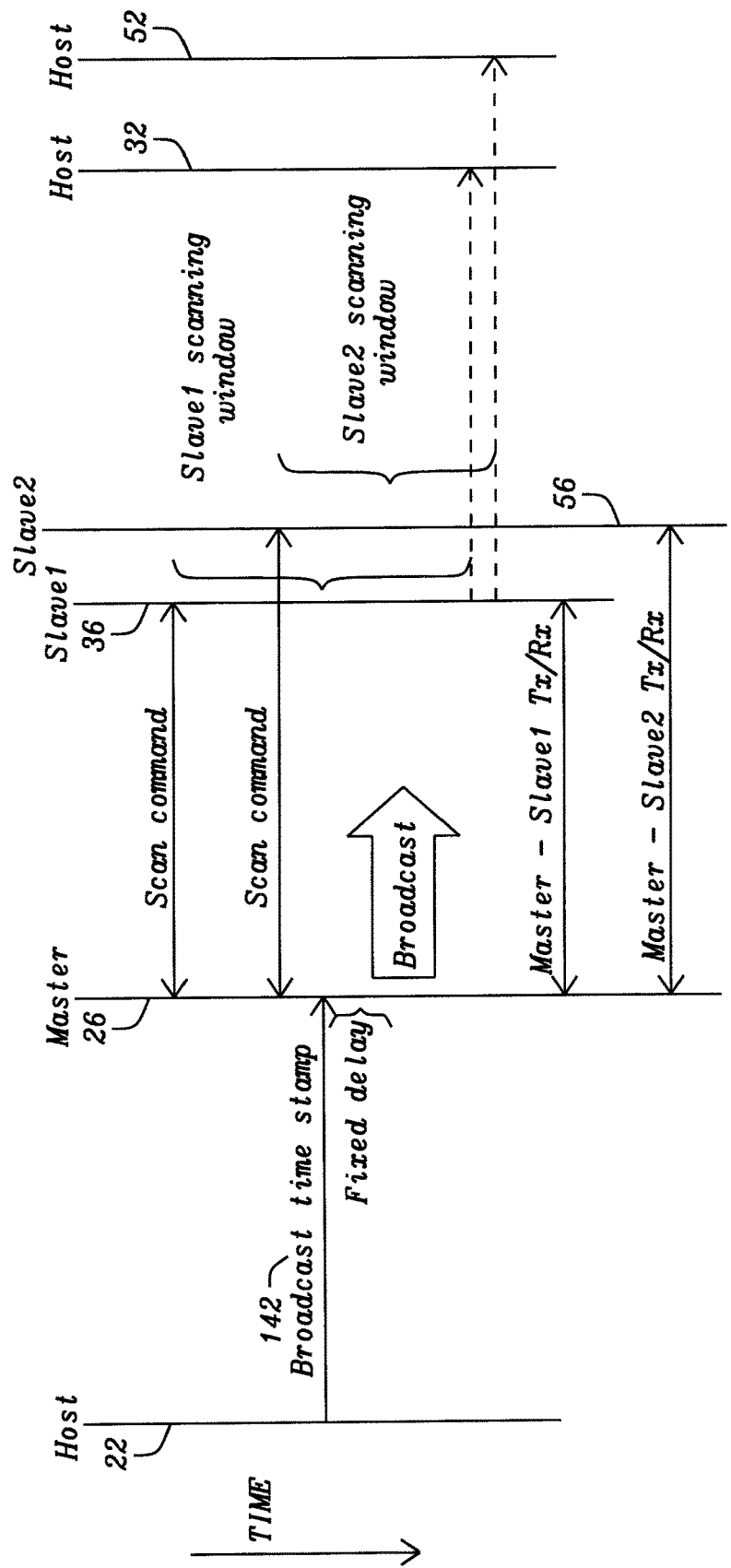
FIG. 5 is a timeline diagram showing the timing of connection events for the devices of FIG. 3.

FIG. 4 is a flowchart showing the steps of a method according to the disclosure for synchronising the clocks of the master device 20 and two slave devices. FIG. 5 shows a timeline of data transmission between the master device 20 and slave devices.

The three devices are all initially connected. At step 60, the master device 20 sends a scan command to both slave devices. This causes them to switch to scanning mode.

The master device 20 specifies a relatively long scanning period, say 1 s, for each slave device. At step 62, the slave devices begin scanning for broadcast data on the advertising channels. In the scanning mode, a device continuously listens for broadcast data.

At step 64, the master device 20 switches to broadcast mode. It then broadcasts data which includes a first time stamp 142 at step 66. In the broadcasting mode, data is sent once every specified broadcast interval. The master device 20 specifies a relatively long broadcast interval, say 1 s. However, the master device 20 immediately stops broadcasting after one set of advertising packets have been sent.

The advertising packets are broadcast immediately after being generated. There is only a small, deterministic delay as the generated first time stamp 142 is passed to the controller 26 of the master device 20. Since the devices are connecting via Bluetooth, the devices are near to each other and so there is virtually no delay associated with the transmission between devices since the data is transmitted at light speed.

At step 68, each slave device receives the first time stamp 142. Since the slave devices are near to each other, they will receive the first time stamp 142 at virtually the same time.

Also, the slave devices will receive the first time stamp 142 within a microsecond or so from the time the first time stamp 142 was generated and sent by the master device 20. As the advertising packets are being broadcast immediately, and because the slave devices are continuously and already listening in scanning mode, there is no random delay.

In a preferred embodiment, the steps of sending the scan command, setting the master device to the broadcast mode and broadcasting data, and scanning the broadcasting data are all performed between two successive connection events. Before the next connection event, the master and slave devices are switched back to their initial connection mode. Therefore, the devices do not need to go through the connection procedure to reconnect.

In an alternative embodiment, the master and slave devices disconnect before performing the broadcasting and scanning steps and then reconnect afterwards.

At step 70, each slave device resets its clock in accordance with the first time stamp 142. This results in each of the master device 20, first slave device 30 and second slave device 50 being accurately synchronised to within a microsecond or so.

At step 72, each slave device then generates and sends a second time stamp to the master device 20. This is received at the master device 20 and then compared with a time of receipt of the second time stamp at step 74. This verifies both that the clocks of the slave devices are synchronised with each other and with the master device 20.

Various modifications and improvements can be made to the above without departing from the scope of the disclosure. For instance, FIGS. 3 to 5 relate to a network of a master and two slave devices. However, the network may comprise a master and only one slave device, or a master and more than two slave devices. Also, the network may comprise a scatternet comprising more than one master device.

What is claimed is:

1. A method of synchronising the clocks of a master device and at least a first slave device which are connected on a BLE network, the method comprising:
    sending a scan command from the master device to at least the first slave device;
    setting the master device to a broadcast mode and broadcasting data, the broadcast data comprising a first time stamp; and
    scanning the broadcasting data at at least the first slave device and resetting the clock of the first slave device using the first time stamp.

2. The method as claimed in claim 1, comprising synchronising the clocks of a master device and a plurality of slave devices.

3. The method as claimed in claim 1, including sending the scan command to at least the first slave device to scan at least one advertising channel, and broadcasting data from the master device on at least one advertising channel.

4. The method as claimed in claim 1, including configuring the master device to broadcast only one set of advertising packets.

5. The method as claimed in claim 1, including configuring the master device to broadcast data between two successive connection events.

6. The method as claimed in claim 1, including configuring at least the first slave device to send a second time stamp to the master device.

7. The method as claimed in claim 6, including configuring the master device to compare the received second time stamp with a time of receipt of the second time stamp.

8. A system comprising a master device connected to at least a first slave device on a BLE network,
    wherein the master device is configured to:
        send a scan command to at least the first slave device; and
        switch to a broadcast mode and broadcast data, the broadcast data comprising a first time stamp,
    and wherein at least the first slave device is configured to:
        scan the broadcasting data and reset the clock of the first slave device using the first time stamp.

9. The system as claimed in claim 8, wherein the master device is connected to a plurality of slave devices.

10. The system as claimed in claim 8, wherein the first slave device is configured to scan at least one advertising channel, and wherein the master device is configured to broadcast data on at least one advertising channel.

11. The system as claimed in claim 8, including configuring the master device to broadcast data between two successive connection events.

12. The system as claimed in claim 8, wherein the master device is configured to broadcast only one set of advertising packets.

13. The system as claimed in claim 8, wherein subsequent to reconnecting the master device and at least the first slave device, at least the first slave device is configured to send a second time stamp to the master device.

14. The system as claimed in claim 13, wherein the master device is configured to compare the received second time stamp with a time of receipt of the second time stamp.

* * * * *